United States Patent [19]
Laskai et al.

[11] Patent Number: 5,969,955
[45] Date of Patent: Oct. 19, 1999

[54] PUSH-PULL POWER CONVERTER WITH CROWBAR CIRCUIT FOR VERY FAST OUTPUT VOLTAGE TURN-OFF

[75] Inventors: Laszlo Laskai; Milan Zarko Ilic, both of Clifton Park, N.Y.

[73] Assignee: General Electric Company, Schenectady, N.Y.

[21] Appl. No.: 09/222,353

[22] Filed: Dec. 29, 1998

[51] Int. Cl.$^6$ ............................................. H02M 3/335
[52] U.S. Cl. ................................. 363/25; 363/17
[58] Field of Search .............................. 363/16, 17, 24, 363/25, 55, 56, 95, 98, 132, 133, 134

[56] References Cited

U.S. PATENT DOCUMENTS

| | | | |
|---|---|---|---|
| 4,584,635 | 4/1986 | MacInnis et al. | 363/25 |
| 5,218,522 | 6/1993 | Phelps et al. | 363/124 |
| 5,488,554 | 1/1996 | Green | 363/25 |
| 5,822,201 | 10/1998 | Kijima | 363/25 |

Primary Examiner—Matthew Nguyen
Attorney, Agent, or Firm—Jill M. Breedlove; Douglas E. Stoner

[57] ABSTRACT

A forward converter useful in a power supply utilizing an isolation transformer includes a crowbar circuit and control such that turn-off by discharging an output capacitor is made advantageously faster than conventional circuits. The forward converter has a push-pull arrangement of two switching devices. For operation in the output voltage-on mode, the forward converter transfers energy in a peak forward converter mode with the first switching device being turned on and off. For output voltage turn-off, the crowbar circuit is activated by turning on the second switching device which results in a reverse voltage at the secondary winding of the isolation transformer. The reverse voltage is superimposed on the converter output voltage, the sum of the converter output voltage and the reverse voltage being imposed across the crowbar circuit. If the sum of the converter output voltage and the reverse voltage exceeds the breakover voltage of the crowbar circuit, the output capacitor discharges rapidly through the crowbar circuit and the transformer secondary winding.

16 Claims, 3 Drawing Sheets

PUSH-PULL POWER CONVERTER WITH CROWBAR CIRCUIT FOR VERY FAST OUTPUT VOLTAGE TURN-OFF

BACKGROUND OF THE INVENTION

The present invention relates generally to power supplies utilizing transformer isolation and requiring very fast isolated voltage turn-off, such as may be useful in electron tube applications, such as x-ray tubes or electron beam guns, for example.

As an exemplary application, gridding circuits for controlling x-ray tubes reduce radiation exposure associated with decaying x-ray tube current. For fast x-ray beam turn-on and turn-off, the gridding voltage must be applied and removed rapidly. In typical gridding circuit arrangements, the grid voltage turn-off (i.e., x-ray beam turn-on) is accomplished by discharging an output capacitor through a bleeder resistor. Due to the time needed to discharge the output capacitor, as well as a practical limitation on the power loss allowable in the bleeder resistor, the output capacitance value is limited. As the output capacitance is limited, a high-gain path is formed between the output capacitance and the parasitic capacitance of the grid with respect to ground for the ac ripple from the high voltage generator. The modulation caused by the ac ripple across the grid and cathode during x-ray exposure tends to shorten filament life, and hence tube life, and also tends to degrade image quality.

Low output impedance gridding circuits are available but are limited in dynamics, e.g., by the time required to reset or discharge the parasitic impedances introduced by the isolation transformer magnetizing inductance and winding capacitance. Other low impedance gridding circuit arrangements disadvantageously require that the power control and gating arrangement be supplied from the filament drive, typically resulting in reliability problems.

Accordingly, it is desirable to provide a simple gridding circuit with a low output impedance which does not restrict grid dynamics, e.g., in terms of time and speed. It is furthermore desirable to provide a gridding circuit which overcomes reliability issues associated with existing gridding circuit arrangements.

BRIEF SUMMARY OF THE INVENTION

A forward converter, comprising a push-pull arrangement of switching devices, is coupled through an isolation transformer to a crowbar circuit and an output capacitor for controlling the isolated output voltage turn-off. The crowbar circuit, comprising a trigger device, is coupled between the transformer and the output capacitor. For operation in the output voltage-on mode, the forward converter transfers energy in a peak forward converter mode with the first switching device being turned on and off. For output voltage turn-off, the crowbar circuit is activated by turning on the second switching device which results in a reverse voltage at the secondary winding of the isolation transformer. The reverse voltage is superimposed on the converter output voltage, the sum of the converter output voltage and the reverse voltage being imposed across the crowbar circuit. If the sum of the converter output voltage and the reverse voltage exceeds the breakover voltage of the crowbar circuit, the output capacitor discharges rapidly through the crowbar circuit and the transformer secondary winding.

DETAILED DESCRIPTION OF THE INVENTION

A converter with crowbar circuitry in accordance with preferred embodiments of the present invention is applicable generally to power supplies utilizing transformer isolation and requiring fast output voltage turn-off. Exemplary applications include electron tube applications, such as x-ray tubes and electron beam guns. By way of example only, however, the description herein is provided with particular reference to x-ray tube gridding circuits.

Figure 1:
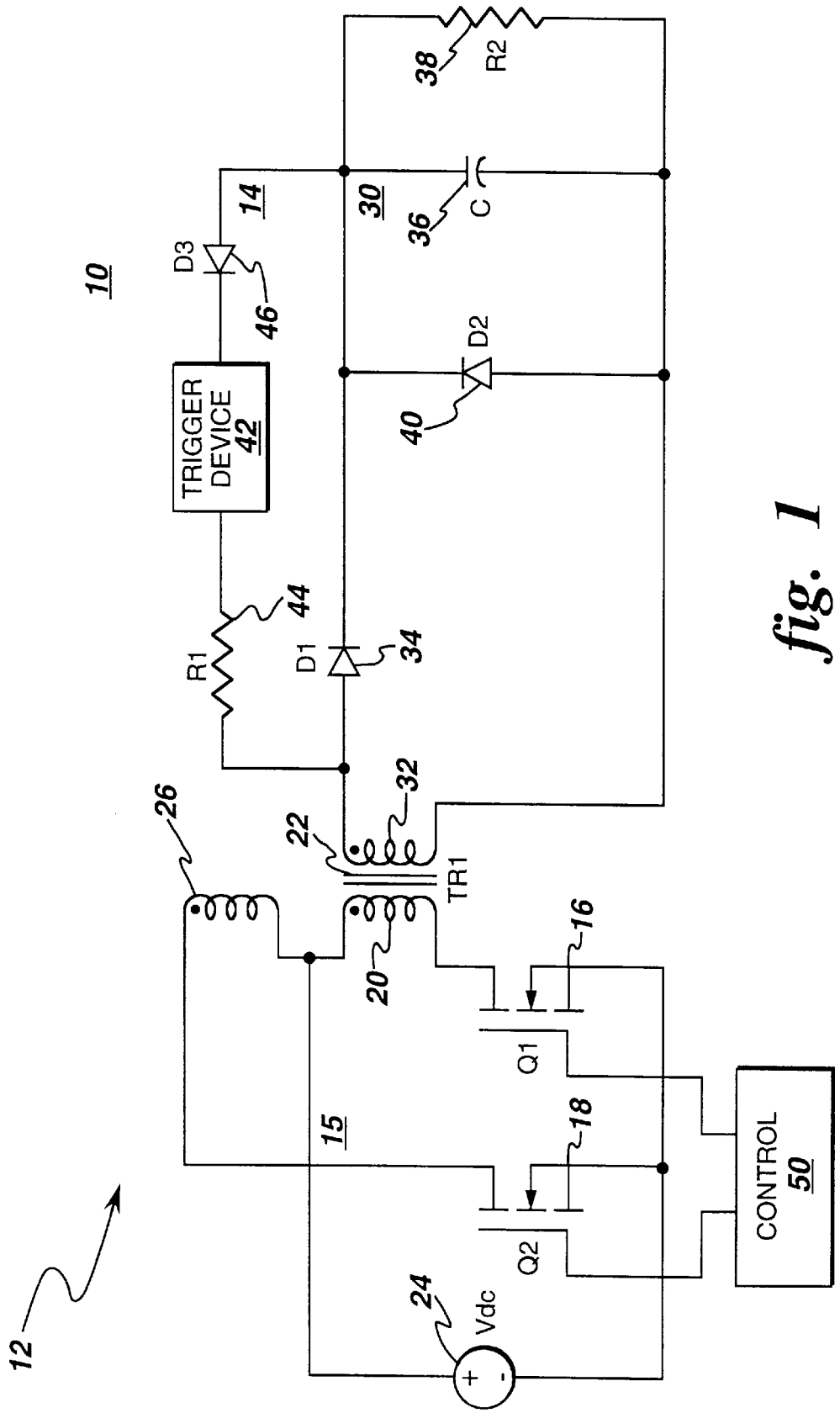
FIG. 1 schematically illustrates a power converter, including a crowbar circuit, in accordance with preferred embodiments of the present invention.

FIG. 1 illustrates a circuit 10 comprising a converter 12 and a crowbar circuit 14, suitable as a gridding circuit for an x-ray tube, for example. Converter 12 comprises an input push-pull converter stage 15 with switching devices 16 (Q1) and 18 (Q2). Switching device 16 (Q1) is coupled in series with a primary winding 20 of an isolation transformer 22 (TR1), the series combination of device 16 and winding 20 being connected in parallel across an input voltage supply 24 (Vdc). Switching device 18 (Q2) is connected in series with a secondary (or reset) winding 26 of transformer 22, the series combination of device 18 and winding 26 also being connected in parallel across supply 24. An output stage 30 of forward converter 12 comprises a secondary winding 32 of transformer 22, one terminal of which is connected to the anode of a rectifying diode 34 (D1). The cathode of diode 34 is connected to an output capacitor 36 (C) which is illustrated as being connected in parallel with a resistor 38 (R2). Another diode 40 (D2) is connected in parallel with output capacitor 36 such that the cathode of diode 40 is connected to the cathode of diode 34.

Figure 2:
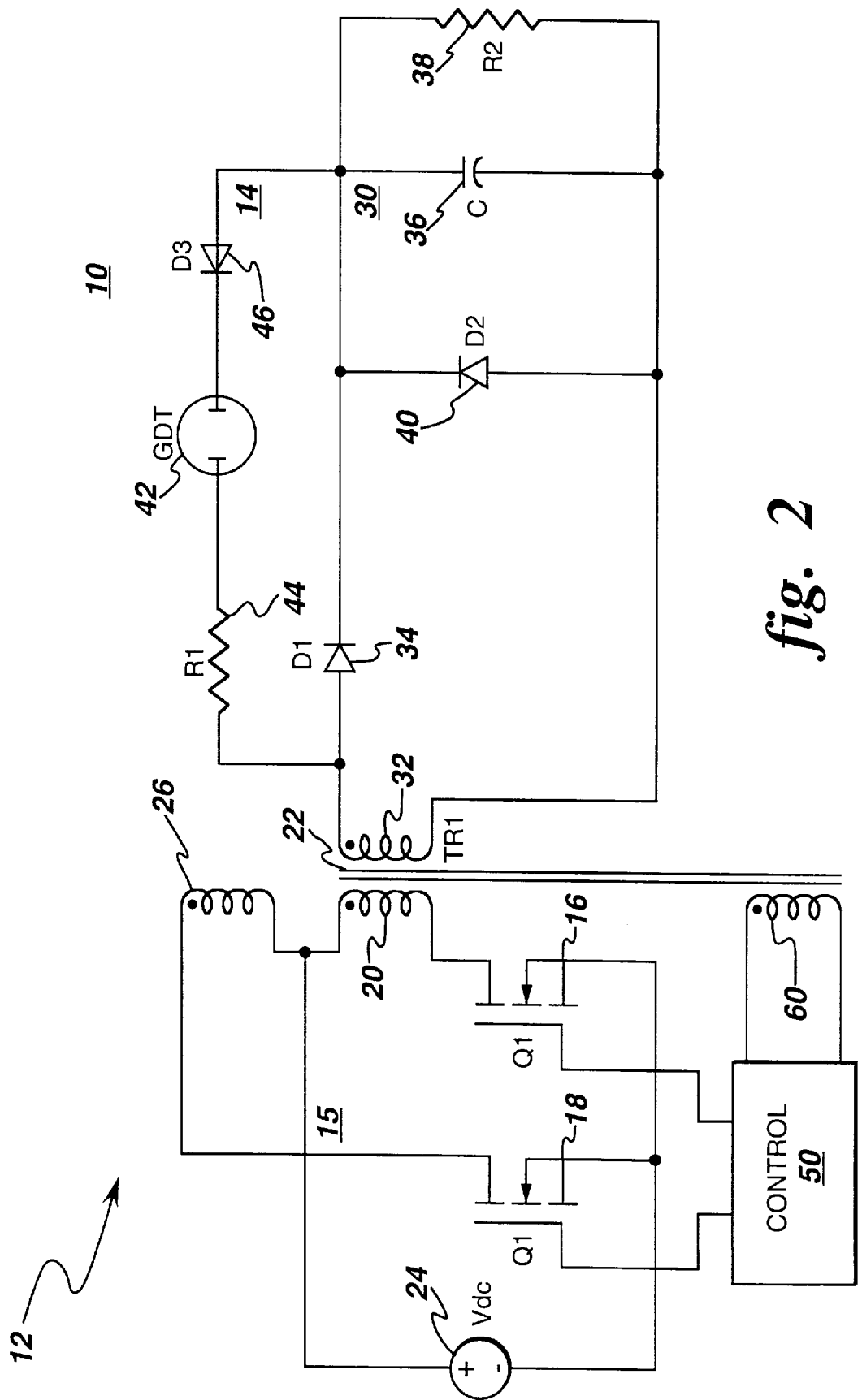
FIG. 2 schematically illustrates an alternative embodiment of the circuit of FIG. 1.
Figure 3:
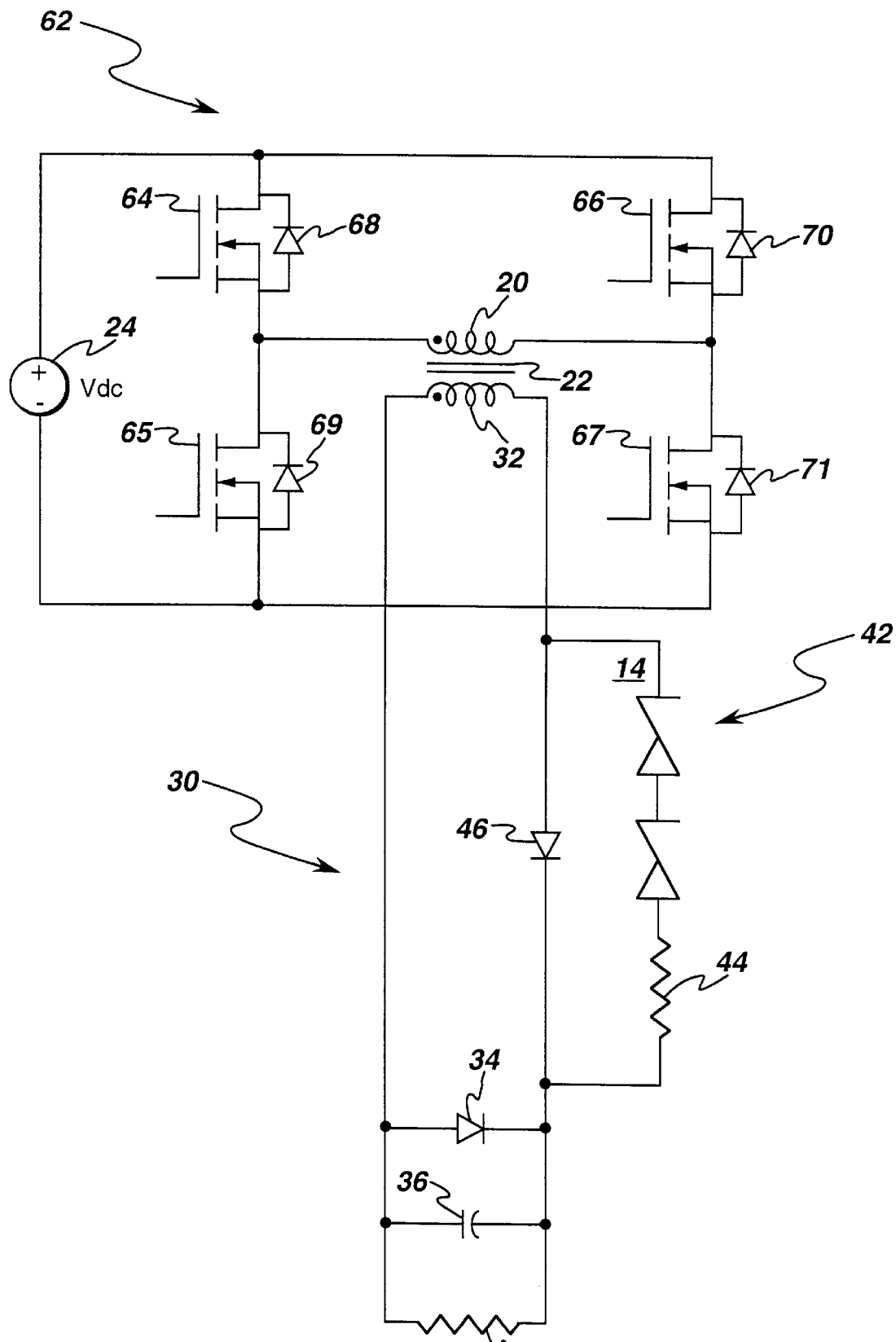
FIG. 3 schematically illustrates another alternative embodiment of a power converter including a crowbar circuit in accordance with preferred embodiments of the present invention.

The crowbar circuit 14 is coupled across diode 34 (D1). (Crowbar is a term known generally in the art to mean a controlled short-circuit.) The crowbar circuit comprises a trigger device 42, which is shown as being connected in series with a current-limiting resistor 44 (R1) and a diode 46 (D3). The trigger device may comprise a gas discharge tube, as illustrated in FIG. 2, for example. Alternatively, the trigger device may comprise any other suitable high-voltage trigger device, such as a SIDAC or a series of SIDACS, for example, as illustrated in FIG. 3. Another suitable alternative for some applications may be a krytron, for example.

In operation, the forward converter provides a voltage step-up function and isolation. Specifically, the forward converter steps up voltage to a predetermined grid voltage which is isolated by transformer 22 and referenced to a cathode potential that is sufficient to turn on and off the x-ray tube current. In one example, the voltage is stepped up from 72V to 3500V.

In the grid-on (or output voltage-on) mode, power is transferred from the input converter stage 15 to the output converter stage 30 via transformer 22 by turning on and off device Q1 through a control 50. The inherent reverse (or anti-parallel) diode of device Q2 connects reset winding to ground such that after each input voltage pulse, the core of transformer 22 is reset.

When a grid-off (or output voltage turn-off) command is issued through control 50, device Q2 is gated on, and a reverse voltage is generated on secondary winding 32. The reverse voltage is superimposed on the converter output voltage such that the sum of the reverse voltage and the converter output voltage is applied across crowbar circuit 14. If the sum of the reverse voltage and the output voltage (i.e., the voltage across the crowbar circuit) is greater than the breakover voltage of the trigger device (e.g., 1000 V), then the output capacitor 36 discharges rapidly (e.g., less than 100 nsec) through the crowbar circuit and transformer secondary winding.

The output impedance of the gridding circuit, i.e., the size of the output capacitor, is limited essentially only by the time required for charging. And because the forward converter provides a direct transfer of energy, this limitation is negligible (e.g., 10–20 $\mu$sec).

Diode D2 is provided as a protection against a possible reverse charge build-up on capacitor C when the grid voltage is turned off.

As a first approximation, the output voltage of the gridding circuit is determined by the input voltage and the transformer turns ratio. However, if the same circuit is used for multiple functions, i.e., gridding and biasing, or a more accurate output voltage regulation is required, a simple feedback loop can be incorporated, such as by including an additional transformer secondary winding 60, as illustrated in FIG. 2, that would produce a voltage signal proportional to the voltage across the secondary winding of the transformer. For such a configuration, since the load current is negligible, the secondary voltage is a good measure of the output voltage.

The trigger device (e.g., gas discharge tube) breakover voltage should be higher than the sum of the output voltage and the reverse voltage that is created by the core reset pulse, but the breakover voltage should be lower than the sum of the output voltage and the reverse voltage generated by the gating of device Q2. During reset of the transformer core, the magnetization energy charges the winding capacitance; hence, the reverse voltage is limited. For example, for a 40 $\mu$H magnetizing inductance and a 20 nF winding capacitance (both referred to the primary), the reverse voltage is approximately 800V. Hence, for a 3500V output voltage, the tube breakover voltage would be between approximately 4300V and 7000V.

FIG. 3 illustrates another alternative embodiment comprising a converter 62 and crowbar circuit 14. Converter 62 comprises a full-bridge switching converter with switching devices 64–67. Switching devices 64–67 have anti-parallel diodes 68–71, respectively, as illustrated. The secondary circuit 30 and the crowbar circuit 14 are the same as those for the circuits of FIGS. 1 and 2. In operation, the anti-parallel diodes reset the transformer winding. For example, when devices 64 and 67 provide the current path and then are turned off, the transformer winding is reset through anti-parallel diodes 69 and 70. This embodiment is particularly applicable for higher power applications.

In accordance with preferred embodiments of the present invention, the effect of transformer parasitic impedances (e.g., magnetizing inductance and winding capacitance) should be minimized. In addition, the output voltage ripple can be minimized since there is no voltage overshoot across the output due to crowbar triggering. Advantageously, circuits according to preferred embodiments of the present invention perform particularly well for low output voltage ripple applications.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power supply circuit, comprising:
    a converter having an input converter stage comprising first and second switching devices in a push-pull configuration, the first switching device being coupled to a primary winding of an isolation transformer, the isolation transformer comprising a secondary winding for coupling the input converter stage to an output converter stage, the output stage comprising an output capacitor and a crowbar circuit, the crowbar circuit comprising a trigger device, the crowbar circuit being connected between the transformer secondary winding and the output capacitor such that the voltage across the crowbar circuit comprises the superposition of the voltage across the output capacitor and the voltage across the secondary winding of the transformer; and
    a control for operating the converter as a forward converter by switching on and off the first switching device in an output voltage-on mode, and for switching on the second switching device in order to create a reverse voltage pulse on the transformer to activate the trigger device for operation in an output voltage-off mode such that the output capacitor discharges through the crowbar circuit.

2. The circuit of claim 1 wherein the isolation transformer comprises minimal parasitic inductance and capacitance.

3. The circuit of claim 1 wherein the crowbar circuit further comprises a current-limiting resistor in series with the trigger device.

4. The circuit of claim 1 wherein the crowbar circuit further comprises means for protecting the output capacitor from a reverse charge build-up during the grid-off mode.

5. The circuit of claim 4 wherein the means for protecting the output capacitor comprises a diode coupled in anti-parallel therewith.

6. The circuit of claim 1 wherein the trigger device comprises a gas discharge tube.

7. The circuit of claim 1 wherein the trigger device comprises at least one SIDAC.

8. The circuit of claim 1 wherein the isolation transformer further comprises a core reset winding coupled through a core reset device to ground such that the transformer core is reset after each input voltage pulse.

9. The circuit of claim 1, further comprising an additional secondary winding on the isolation transformer for providing an output voltage feedback loop.

10. A power supply circuit, comprising:
    a converter having an input converter stage comprising four switching devices and associated anti-parallel diodes in a full-bridge configuration coupled to a primary winding of an isolation transformer, the isolation transformer comprising a secondary winding for coupling the input converter stage to an output converter stage, the output stage comprising an output capacitor and a crowbar circuit, the crowbar circuit comprising a trigger device, the crowbar circuit being connected between the transformer secondary winding and the output capacitor such that the voltage across the crowbar circuit comprises the superposition of the voltage across the output capacitor and the voltage across the secondary winding of the transformer; and
    a control for operating the converter as a forward converter in an output voltage-on mode, and for creating a reverse voltage pulse on the transformer to activate the trigger device for operation in an output voltage-off mode such that the output capacitor discharges through the crowbar circuit, the anti-parallel diodes of the switching devices providing a current path such that the transformer core is reset after each input voltage pulse.

11. The circuit of claim 10 wherein the isolation transformer comprises minimal parasitic inductance and capacitance.

12. The circuit of claim 10 wherein the crowbar circuit further comprises a current-limiting resistor in series with the trigger device.

13. The circuit of claim 10 wherein the crowbar circuit further comprises means for protecting the output capacitor from a reverse charge build-up during the grid-off mode.

14. The circuit of claim 13 wherein the means for protecting the output capacitor comprises a diode coupled in anti-parallel therewith.

15. The circuit of claim 10 wherein the trigger device comprises a gas discharge tube.

16. The circuit of claim 10 wherein the trigger device comprises at least one SIDAC.

* * * * *